C. Salvo,

Fertilizer Distributor.

No. 111,685.  Patented Feb. 7, 1871.

WITNESSES.
Edwin James.
A. Holmead Jr

INVENTOR.
Christopher Salvo.
per J. E. J. Holmead
Attorney.

United States Patent Office.

CHRISTOPHER SALVO, OF COLUMBUS, GEORGIA, ASSIGNOR TO HIMSELF JOSEPH C. BREWER, AND ROBERT W. MILFORD, OF SAME PLACE.

Letters Patent No. 111,685, dated February 7, 1871.

IMPROVEMENT IN FERTILIZER-DISTRIBUTERS.

The Schedule referred to in these Letters Patent and making part of the same.

*To all whom it may concern:*

Be it known that I, CHRISTOPHER SALVO, of Columbus, in the county of Muscogee and State of Georgia, have invented certain new and useful Improvements in Seed-Planters and Fertilizer-Distributers; and I do hereby declare that the following is a full, clear, and exact description of the same, reference being had to the accompanying drawing and to the letters of reference marked thereon making part of this specification, in which—

The object of my invention is to furnish a cheap, simple, durable, and accurate hand seed-planter and fertilizer-distributer, one in which the seed and fertilizer are deposited or fed by a natural flow, thus not only avoiding all complicated mechanism, but also even rendering unnecessary the use of the ordinary plunger and feed-plate or roller.

The nature of my invention consists in constructing the body of the seed-box or hopper cylindrical or of a bucket-shape, terminating in an inverted hollow cone or funnel-shaped base, at the lower section of which is attached a sliding valve, the same being so pivoted as to allow of its free movement in a lateral direction. When closed this valve is supported by an elbow-spring or loop.

Within this cone is secured a series of knives or blades, so arranged that as the seed or fertilizer is fed or flows it shall pass between them, which insures the destruction of all lumps, which, unless they are broken, are liable to clog or choke the planter.

The bucket is provided with a bail, by means of which it can be conveniently carried.

To enable others skilled in the art to make and use my invention, I will now proceed to describe its construction and operation.

A is the body of the seed-box or hopper, and is a cylindrical or bucket-shaped vessel, its lower section A' being in the form of an inverted hollow cone or funnel. These are made of sheet metal or any other suitable material.

B is a sliding-plate valve, and is pivoted to an ear, *a*, at the mouth of the cone or funnel. This valve-plate, like the hopper, is made of any suitable material, and is attached in such manner as to allow of its free lateral movement, and is so arranged that by its movement the seed or fertilizer is fed, the quantity of its flow regulated, and the same interrupted or checked at pleasure.

It is moved to and fro to open and close the funnel-mouth of the hopper by means of a thumb-piece, *b*, or other convenient attachment, secured to the valve-plate.

Figure 1:
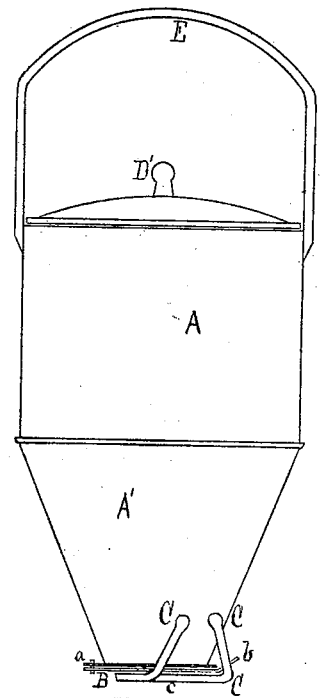
Figure 1 is a front view of the seed-planter and fertilizer-distributer.
Figure 2:
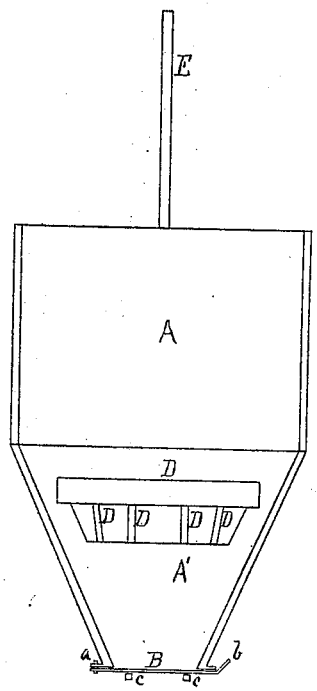
Figure 2 is a vertical sectional view.

C is an elbow-shaped spring or loop, secured to the side of the hopper, as clearly shown in fig. 1.

The arm *c* of the elbow of this spring or loop is directly under the mouth of the funnel, and is bent at such at angle that when the valve is closed it not only serves as a support for the same, but so presses it against its seat as to cause the formation of a perfectly tight joint, thus securely guarding against any escape of the seed or fertilizer until such time as the operator shall desire.

Figure 3:
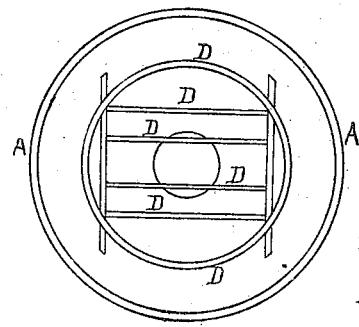
Figure 3 is a top view of the hopper, the cover being removed.

D D are a series of knives or plates, and are secured within and at or near the centre of the cone or funnel-shaped base. These may be of any desired form, either a series of rings or blades, or they may consist of a union of these two sets of forms, as shown in fig. 3.

These knives are so arranged that while they allow the free flow of the seed or powdered guano or other fertilizer they prevent the passage of the same in lumps. On the contrary, the lumps are broken by the knives simply by shaking the bucket.

D' is the top of the bucket, and is of the style usually used with a close vessel.

E is the bail or handle, and is of the usual hoop-form, and permanently attached to the hopper.

The operation is as follows:

The hopper A A' is filled with the seed or fertilizer.

The valve B being closed, the spring C so presses it against its seat that the escape of any portion of the contents is guarded against until the valve is opened, which is easily done.

At the desired time, simply by pressing on the thumb-piece *b* the valve B is opened, when the seed or fertilizer is instantly sown simply by its dropping through the mouth of the funnel A', the knives D D properly separating the same and preventing the passage of any lump sufficiently large to clog or choke the machine.

The size of the opening in the mouth of the funnel through which the guano or seed is fed depending on the position of the valve, the quantity sown can be regulated and controlled at pleasure.

One of the greatest advantages of my improvement is found in the fact that it can be used with comparatively little actual labor, and, consequently, fatigue to the operator. He has simply to take hold of the bail and quietly walk along in a position as erect as he pleases, while the machine successfully and accurately performs its work.

Having thus fully described my invention,
What I claim therein as new, and desire to secure by Letters Patent of the United States, is—

The hopper A A', constructed as stated, valve B, spring C, and knives D D, when the same are so combined and arranged as to operate substantially as described, as and for the purpose specified.

In testimony whereof I have signed my name to this specification in the presence of two subscribing witnesses.

CHRISTOPHER SALVO.

Witnesses:
   THO. J. SHIVERS,
   JNO. E. BACON.